J. A. GALVIN.
WHEEL.
APPLICATION FILED MAY 25, 1917.

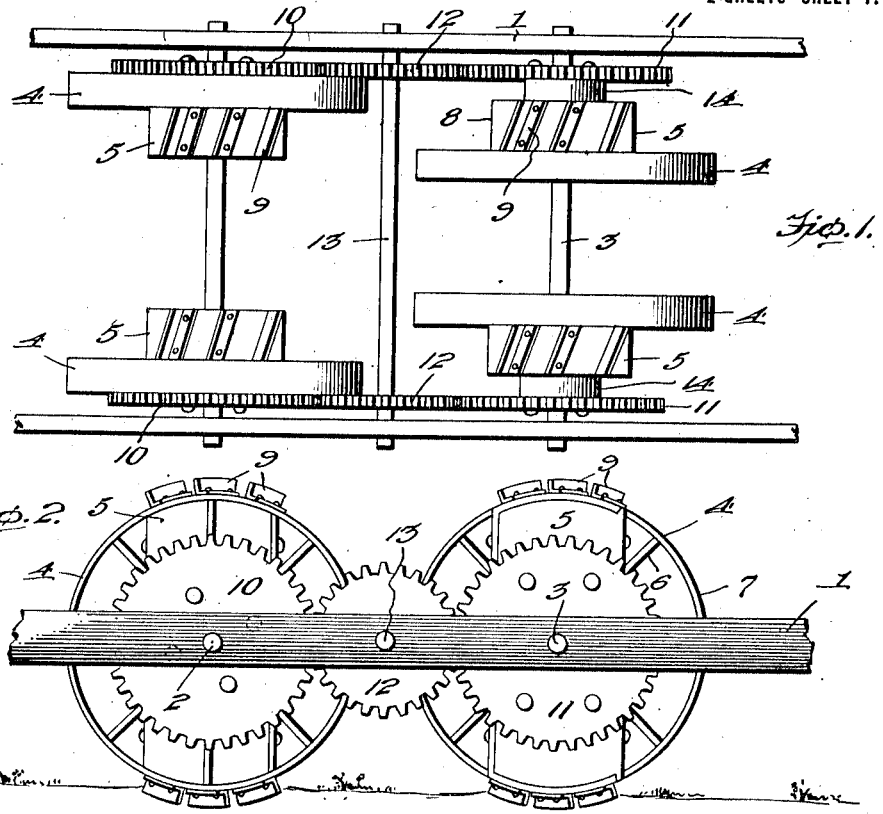

1,270,252.

Patented June 18, 1918.
2 SHEETS—SHEET 2.

WITNESSES

INVENTOR
John A Galvin
BY
ATTORNEY

UNITED STATES PATENT OFFICE.

JOHN A. GALVIN, OF SPALDING, NEBRASKA.

WHEEL.

1,270,252.

Specification of Letters Patent.

Patented June 18, 1918.

Application filed May 25, 1917. Serial No. 170,932.

*To all whom it may concern:*

Be it known that I, JOHN A. GALVIN, a citizen of the United States, residing at Spalding, in the county of Greeley and State of Nebraska, have invented certain new and useful Improvements in Wheels, of which the following is a specification.

This invention relates to new and useful improvements in tractors, and the principal object of the invention is to provide means whereby the tractor can travel over muddy or sandy roads with a minimum amount of effort.

Another object of the invention is to provide means whereby the wheel of the tractor tends to lift itself over mounds of sand or mud during certain parts of its rotation.

Another object of the invention is to provide a tractor with a wheel having its rim provided with a part forming a complete circle and an adjacent part having an interrupted tread formed by having segmental shaped recesses in the wheel.

Another object of the invention is to so arrange the wheels that the interrupted tread on one wheel will be out of line with a whole or complete rim of the other wheel and to the inner side of the same.

Another object of the invention is to provide a simple construction of that part of the wheel provided with the interrupted tread and to provide an easy manner of attaching the incomplete part of the wheel to the complete part.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several parts, and in which:

Figure 1 is a plan view of one form of my invention.

Fig. 2 is a side view thereof.

Fig. 3 is a plan of another form.

Figure 6:
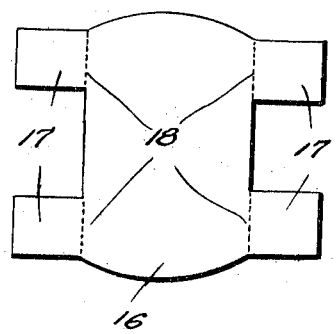
Figs. 5 and 6 are blanks for forming the incomplete part of the wheel.
Figure 5:
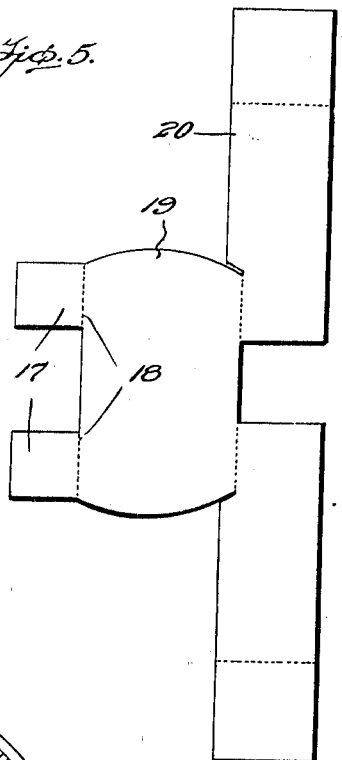

In these figures, 1 indicates the frame of the tractor to which the wheels are attached, while 2 indicates the front axle and 3 the rear axle. Each of the four wheels comprises a complete portion 4 and an incomplete portion 5. The complete portion 4 is made of ordinary form and has the spokes 6 and the rim 7. The portion 5 has an interrupted rim or tread formed by making it of two opposed arcs, connected by two parallel chords, thus providing segmental shaped recesses in the wheel so that the rim 8 of the portion 5 only comes into contact with the ground at certain points in the rotation of the wheel. Wherever necessary, the wheel may be provided with mud lugs 9 and these lugs may be placed on the incomplete portion of the wheel, or on the complete portion, or both. I prefer to so mount the front and rear wheels that the complete portion 4 of the rear wheel is out of alinement with the front wheel and the complete portion of the front wheel is also out of alinement with any part of the rear wheel and is closer to the frame than any part of said rear wheel. This prevents the incomplete parts of the wheels from striking against the bank along the side of the road. 10 represents a tooth wheel located on the front wheel, and 11 indicates a like wheel located on the rear wheel and these two toothed wheels are connected by a smaller tooth wheel 12 located on a shaft 13 driven in any desirable manner from the engine. In order to place these toothed wheels in alinement, I place a spool 14 on the shaft 3 between the toothed wheel 11 and the incomplete part 5 of the wheel. I prefer to place these tooth wheels on each side of the tractor, as shown. In the modification shown in Fig. 3, I form the front wheels 15 of ordinary shape, omitting the incomplete part and I replace the two rear wheels by one large wheel provided with a complete wheel 4' having a complete tread and on each side of this complete wheel I place the part 5' having the interrupted tread. These wheels are driven by the tooth gearing as before, and the front wheels are closer to the frame than any part of the rear wheel, as before described.

Figure 4:
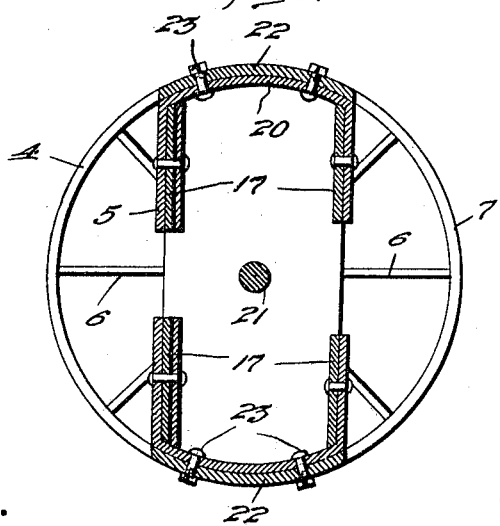
Fig. 4 is a sectional view, through the incomplete part of the wheel.

I prefer to form the incomplete part of the wheel of two blanks of steel, one 16 forming one side of the incomplete wheel and having the tabs 17 projecting therefrom, one at each corner, said tabs being adapted to be bent at right angles to the body portion, as shown by the dotted lines 18. The other blank 19 is of the same shape as the first blank and is provided with the tabs as before, but the tabs on one side are extended as at 20 and are adapted to be bent around the curved ends of the blanks and to be secured to the tabs on the other side. Thus, when the blanks are placed together and the tabs bent over and riveted, a body is produced of rectangular shape having curved ends, as shown in Fig. 4. This body is provided with a hole 21 to receive the axle and I prefer to secure this body to the complete part of the wheel by providing said complete part with extensions 22 formed on its rim between which the body is placed and bolted thereto by means of the bolts 23. Thus a wheel is formed having a complete rim or tread and having segmental recesses therein to one side of the complete rim, forming a part with an interrupted rim or tread.

When the complete part of the wheel passes through mud or sand, it leaves a bank of it alongside and then the incomplete rim comes down on top of this mound and tends to lift the wheel over the mound.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. A tractor wheel consisting of a cylindrical member, an interrupted cylindrical member adjacent thereto and comprising a blank, rim-parts coincident with the rim of the cylindrical member and tabs at the extremities of said parts, the tabs on one part projecting toward the tabs on the other along the edges of said blank, and means for connecting each complete member with its contiguous interrupted member.

2. A tractor wheel consisting of a cylindrical member, an interrupted cylindrical member adjacent thereto and comprising a blank, rim-parts coincident with the rim of the cylindrical member and tabs at the extremities of said parts, the tabs on one part projecting toward the tabs on the other along the edges of said blank, spokes within the complete member whereby it may be mounted on an axle, and extensions from one side of the rim of this member connected with the rim parts of the interrupted member, as described.

3. A tractor wheel consisting of a circular member and an oblong member having its ends curved to correspond with the circumference of the other member, and means for securing the two members together.

4. A tractor wheel consisting of a circular member having side extensions on its rim and an oblong member having its ends curved to correspond with the rim of the circular member and fitting between said extensions and means for securing the two members together.

5. A wheel consisting of a circular member and an oblong member having its ends curved to correspond with the circumference of the other member, said oblong member being formed of two blanks forming the sides thereof, each of said blanks having a tab at each corner adapted to be bent at right angles to engage the tabs on the other blank, the tabs on one end of one blank being extended and extending around the curved ends of the blanks so as to be secured to the other tabs on the other side to form the edges of the member and means for securing the tabs together.

6. In a tractor a wheel having flat portions on its tread, a front wheel, and gear wheels connecting the wheels together, said front wheel being out of alinement with the other wheel, and a spool located between the rear wheel and the gear wheel for placing the gear wheels in alinement.

7. In a tractor, the combination with front and rear axles, and a drive shaft between them; of a pair of tractor wheels on the front axle, each having a complete and an interrupted portion, a similar pair of wheels on the rear axle, each having similar portions but with their complete portions out of alinement with any part of the front wheels, and connections between the drive shaft and both pairs of wheels for causing their rotation.

8. In a tractor, the combination with front and rear axles, and a drive shaft between them; of a pair of tractor wheels on the front axle, each having a complete and an interrupted portion, a similar pair of wheels on the rear axle, each having similar portions but with their complete portions out of alinement with any part of the front wheels, toothed wheels secured to the outer sides of all tractor wheels, and toothed driving wheels on said shaft meshing with the others, for the purpose set forth.

In testimony whereof I affix my signature in presence of two witnesses.

JOHN A. GALVIN.

Witnesses:
 CHAS. M. DAVLIN,
 PAUL A. DAVLIN.